United States Patent [19]

Yang

[11] Patent Number: 4,937,666

[45] Date of Patent: Jun. 26, 1990

[54] CIRCUIT IMPLEMENTATION OF BLOCK MATCHING ALGORITHM WITH FRACTIONAL PRECISION

[75] Inventor: Kun-Min Yang, Somerville, N.J.

[73] Assignee: Bell Communications Research, Inc., Livingston, N.J.

[21] Appl. No.: 445,786

[22] Filed: Dec. 4, 1989

[51] Int. Cl.$^5$ .............................................. H04N 7/12
[52] U.S. Cl. ..................................... 358/136; 358/135
[58] Field of Search ............... 358/136, 135, 133, 105; 382/56; 341/106

[56] References Cited

U.S. PATENT DOCUMENTS

| | | | |
|---|---|---|---|
| 4,862,261 | 8/1989 | Tanaka | 358/133 |
| 4,897,720 | 1/1990 | Wu et al. | 358/136 |
| 4,901,145 | 2/1990 | Harradine | 358/136 |

*Primary Examiner*—James J. Groody
*Assistant Examiner*—Victor R. Kostak
*Attorney, Agent, or Firm*—James W. Falk

[57] ABSTRACT

A circuit for carrying out a full search block matching algorithm with fractional pixel precision comprises a first subcircuit for obtaining displacement vectors with integer pixel value precision and a second subcircuit for correcting the displacement vectors obtained by the subcircuit so that the displacement vectors have fractional pixel value precision. To obtain a displacement vector with integer value precision for a block of pixels of a current video frame in a search area of a previous video frame, the first subcircuit finds a first specific position of the block with the smallest error out of a first plurality of positions defined by integer pixel values in the search area. The second subcircuit interpolates the integer pixel values of the first specific position to obtain fractional pixel values which define a second plurality of positions in the search area. The second subcircuit then determines which position of the block in the second plurality of positions has the smallest error, thereby providing a correction with fractional pixel precision for the displacement vector.

12 Claims, 9 Drawing Sheets

| FIG. 10A | FIG. 10B |
|---|---|

| t | INPUT DATA | CIRCUIT 50 OUTPUT | CIRCUIT 60 OUTPUT | | | |
|---|---|---|---|---|---|---|
| 0 | b(0,0), b(1,0) | | | | | |
| 1 | | $b_0^0(0,0)$ | | | | |
| 2 | | $b_0^1(0,0)$ | | | | |
| 3 | | $b_0^2(0,0)$ | | | | |
| 4 | b(0,1), b(1,1) | $b_0^3(0,0)$ | | | | |
| 5 | | $b_0^0(0,1)$ | | | | |
| 6 | | $b_0^1(0,1)$ | $b_0^0(0,0)$ | $b_1^0(0,0)$ | $b_2^0(0,0)$ | $b_3^0(0,0)$ |
| 7 | | $b_0^2(0,1)$ | $b_0^1(0,0)$ | $b_1^1(0,0)$ | $b_2^1(0,0)$ | $b_3^1(0,0)$ |
| 8 | b(0,2), b(1,2) | $b_0^3(0,1)$ | $b_0^2(0,0)$ | $b_1^2(0,0)$ | $b_2^2(0,0)$ | $b_3^2(0,0)$ |
| 9 | | $b_0^0(0,2)$ | $b_0^3(0,0)$ | $b_1^3(0,0)$ | $b_2^3(0,0)$ | $b_3^3(0,0)$ |
| 10 | | $b_0^1(0,2)$ | $b_0^0(0,1)$ | $b_1^0(0,1)$ | $b_2^0(0,1)$ | $b_3^0(0,1)$ |
| 11 | | $b_0^2(0,2)$ | $b_0^1(0,1)$ | $b_1^1(0,1)$ | $b_2^1(0,1)$ | $b_3^1(0,1)$ |
| 12 | b(0,3), b(1,3) | $b_0^3(0,2)$ | $b_0^2(0,1)$ | $b_1^2(0,1)$ | $b_2^2(0,1)$ | $b_3^2(0,1)$ |
| 14 | | $b_0^0(0,3)$ | $b_0^3(0,1)$ | $b_1^3(0,1)$ | $b_2^3(0,1)$ | $b_3^3(0,1)$ |
| 15 | | $b_0^1(0,3)$ | $b_0^0(0,2)$ | $b_1^0(0,2)$ | $b_2^0(0,2)$ | $b_3^0(0,2)$ |
| 16 | | $b_0^2(0,3)$ | $b_0^1(0,2)$ | $b_1^1(0,2)$ | $b_2^1(0,2)$ | $b_3^1(0,2)$ |
| 17 | b(0,4), b(1,4) | $b_0^3(0,3)$ | $b_0^2(0,2)$ | $b_1^2(0,2)$ | $b_2^2(0,2)$ | $b_3^2(0,2)$ |
| 18 ⋮ | ⋮ | ⋮ | $b_0^3(0,2)$ | $b_1^3(0,2)$ | $b_2^3(0,2)$ | $b_3^3(0,2)$ |
| 60 | b(0,15), b(1,15) | | | | | |
| 61 | | $b_0^0(0,15)$ | | | | |
| 62 | | $b_0^1(0,15)$ | | ⋮ | | |
| 63 | | $b_0^2(0,15)$ | | | | |
| 64 | b(0,16), b(1,16) | $b_0^3(0,15)$ | | | | |
| 65 | | $b_0^0(0,16)$ | | | | |
| 66 | | $b_0^1(0,16)$ | $b_0^0(0,15)$ | $b_1^0(0,15)$ | $b_2^0(0,15)$ | $b_3^0(0,15)$ |
| 67 | | $b_0^2(0,16)$ | $b_0^1(0,15)$ | $b_1^1(0,15)$ | $b_2^1(0,15)$ | $b_3^1(0,15)$ |
| 68 | | $b_0^3(0,16)$ | $b_0^2(0,15)$ | $b_1^2(0,15)$ | $b_2^2(0,15)$ | $b_3^2(0,15)$ |
| | | | $b_0^3(0,15)$ | $b_1^3(0,15)$ | $b_2^3(0,15)$ | $b_3^3(0,15)$ |

FIG. 10B

| $PE_0$ | $PE_1$ | $PE_2$ | $PE_3$ |
|---|---|---|---|
| | | | |
| $a(0,0)-b_0^0(0,0)$ | $a(0,0)-b_1^0(0,0)$ | $a(0,0)-b_2^0(0,0)$ | $a(0,0)-b_3^0(0,0)$ |
| $a(0,0)-b_0^1(0,0)$ | $a(0,0)-b_1^1(0,0)$ | $a(0,0)-b_2^1(0,0)$ | $a(0,0)-b_3^1(0,0)$ |
| $a(0,0)-b_0^2(0,0)$ | $a(0,0)-b_1^2(0,0)$ | $a(0,0)-b_2^2(0,0)$ | $a(0,0)-b_3^2(0,0)$ |
| $a(0,0)-b_0^3(0,0)$ | $a(0,0)-b_1^3(0,0)$ | $a(0,0)-b_2^3(0,0)$ | $a(0,0)-b_3^3(0,0)$ |
| $a(0,1)-b_0^0(0,1)$ | $a(0,1)-b_1^0(0,1)$ | $a(0,1)-b_2^0(0,1)$ | $a(0,1)-b_3^0(0,1)$ |
| $a(0,1)-b_0^1(0,1)$ | $a(0,1)-b_1^1(0,1)$ | $a(0,1)-b_2^1(0,1)$ | $a(0,1)-b_3^1(0,1)$ |
| $a(0,1)-b_0^2(0,1)$ | $a(0,1)-b_1^2(0,1)$ | $a(0,1)-b_2^2(0,1)$ | $a(0,1)-b_3^2(0,1)$ |
| $a(0,1)-b_0^3(0,1)$ | $a(0,1)-b_1^3(0,1)$ | $a(0,1)-b_2^3(0,1)$ | $a(0,1)-b_3^3(0,1)$ |
| $a(0,2)-b_0^0(0,2)$ | $a(0,2)-b_1^0(0,2)$ | $a(0,2)-b_2^0(0,2)$ | $a(0,2)-b_3^0(0,2)$ |
| $a(0,2)-b_0^1(0,2)$ | $a(0,2)-b_1^1(0,2)$ | $a(0,2)-b_2^1(0,2)$ | $a(0,2)-b_3^1(0,2)$ |
| $a(0,2)-b_0^2(0,2)$ | $a(0,2)-b_1^2(0,2)$ | $a(0,2)-b_2^2(0,2)$ | $a(0,2)-b_3^2(0,2)$ |
| $a(0,2)-b_0^3(0,2)$ | $a(0,2)-b_1^3(0,2)$ | $a(0,2)-b_2^3(0,2)$ | $a(0,2)-b_3^3(0,2)$ |
| $\vdots$ | $\vdots$ | $\vdots$ | $\vdots$ |
| $a(0,15)-b_0^0(0,15)$ | $a(0,15)-b_1^0(0,15)$ | $a(0,15)-b_2^0(0,15)$ | $a(0,15)-b_3^0(0,15)$ |
| $a(0,15)-b_0^1(0,15)$ | $a(0,15)-b_1^1(0,15)$ | $a(0,15)-b_2^1(0,15)$ | $a(0,15)-b_3^1(0,15)$ |
| $a(0,15)-b_0^2(0,15)$ | $a(0,15)-b_1^2(0,15)$ | $a(0,15)-b_2^2(0,15)$ | $a(0,15)-b_3^2(0,15)$ |
| $a(0,15)-b_0^3(0,15)$ | $a(0,15)-b_1^3(0,15)$ | $a(0,15)-b_2^3(0,15)$ | $a(0,15)-b_3^3(0,15)$ |

CIRCUIT IMPLEMENTATION OF BLOCK MATCHING ALGORITHM WITH FRACTIONAL PRECISION

FIELD OF THE INVENTION

The present invention relates to a technique for video data compression known as motion compensation. More particularly, the present invention relates to a circuit implementation of a full search block matching algorithm having fractional pixel precision.

BACKGROUND OF THE INVENTION

Motion video signals with a scanning rate of 30 frames per second contain a significant amount of frame-to-frame redundancy. For video conferencing applications, in particular, motion in a scene is usually low so that the frame-to-frame data redundancy is high. In such a case, coding techniques can be used to reduce the frame-to-frame redundancy and achieve a high degree of data compression.

Consider first and second successive video frames arising in a video conferencing application. Illustratively, the difference between the two successive frames results from the motion of an object such as the arm or hand of a person. If this motion is confined to a small region of the frame and if the first frame is available at the receiver, then instead of transmitting the entire second frame to the receiver, it is only necessary to transmit the motion information to the receiver. Upon receipt of the motion information, the receiver is able to construct the second frame from the first. In particular, the motion information is obtained by estimating the displacement of the moving object between the second frame and the first frame. The estimated displacement is then transmitted to the receiver so that the receiver can construct the second frame from the first.

Using this method of transmitting video data, it is necessary to transmit the full frame data for only one out of every N interframes (N can be as large as 30) so that a significant amount of data compression is achieved. This technique of data compression is called motion compensation and plays an important role in various video coders.

One technique for estimating the frame-to-frame displacement of an object is known as block matching. In a block matching algorithm, the current (i.e. the second) frame is divided into blocks of pixels. For example, if a frame is 256×256 pixels, it may be divided into two hundred and fifty-six M×N blocks where M and N are both 16 pixels. The purpose of the block matching algorithm is to obtain a displacement vector for each block of pixels in the current frame. A displacement vector indicates the displacement of a block relative to its location in the previous (i.e. the first) frame. These displacement vectors are then transmitted to the receiver so that the receiver can construct the current (i.e. the second) frame from the previous (i.e. the first) frame. In applications with relatively low motion levels, such as video conferencing, many of the displacement vectors are zero.

To calculate a displacement vector for a block of pixels in the current frame, a similarity calculation is performed between the block of the current frame and each of a plurality of equal sized blocks laid out in a generally larger search area of the previous frame. The block of pixels in the current frame and the search area in the previous frame generally have the same center. An error function such as the mean absolute error or mean square error is calculated as a similarity measurement for each position of the block of the current frame in the search area. The displacement vector is the displacement between the location of the block in the current frame and the location of the block in the search area of the previous frame which yields the smallest error.

More particularly, a search area in a previous frame is searched by placing a block of pixels from the current frame at the upper left-hand corner of the search area and calculating the error (mean square or mean absolute) with respect to the overlapped pixels in the search area. The block from the current frame is then moved pixel by pixel to the right-hand boundary of the search area. At each step the error with respect to the overlapped pixels of the search area is calculated. The block of the current frame is then moved down one row of pixels in the search area, and the block is again moved pixel by pixel from the left-hand boundary of the search area to the right-hand boundary, at each step the error with respect to the overlapped pixels of the search area being calculated. The block of pixels from the current frame is then moved down another row and moved from left to right pixel by pixel etc. This process is continued until an error function (mean square or mean absolute) is calculated for all possible block positions in the search area. (Hence the name, full search block matching algorithm). The calculated mean errors are compared and the block position that produces the minimum error defines the displacement vector for the block.

The full search block matching procedure described above demands a very large amount of computation. For this reason, U.S. patent application, Ser. No. 07/167,327, filed for L. Wu and K-M Yang on Mar. 14, 1988, and entitled "Circuit Implementation of Block Matching Algorithm" discloses a circuit formed as a single VLSI chip for implementing a full search block matching algorithm. The above-identified patent application is assigned to the assignee hereof and is incorporated herein by reference. (See also, K.-M Yang et al., "A VLSI Architecture Design for Motion Detection/Compensation Chip With Full Search Capability", Proceedings of 1988 Conference on Information Sciences and Systems, Vol. II, pp 695–700, 1988).

The circuit disclosed in the above-identified patent application incorporates a highly efficient data flow design which enables the circuit to be of small size, high speed and utilize highly parallel processing. More particularly, the circuit for implementing a full search block matching algorithm receives the pixel values comprising the block from the current frame and the pixel values comprising the search area of the previous frame sequentially. Thus the circuit requires a relatively small number of pins and has a relatively small area so that it is of reasonable cost.

The circuit uses parallel processing to take advantage of the fact that the mean square or mean absolute error calculations for adjacent positions of a block from the current frame in a search area of the previous frame utilize a significant number of pixel value inputs in common. Thus, a plurality of processors calculates in parallel the mean square error or the mean absolute error arising from a plurality of block positions in the search area. For example, the errors of the block positions arrived at by moving the block of the current frame horizontally pixel by pixel from the left-hand boundary of the search area to the right-hand boundary may be calculated in parallel. (In other words, the errors for one row of block positions in the search area are calculated in parallel.) Each of the processors performs an error calculation for one position of the block in the search area. The circuit includes internal bus structures for transporting the pixel values of the current and previous frames to the processors so that the error calculations for the plurality of block positions can proceed in parallel. Illustratively, a first bus structure is used for pipelining pixel values of the current frame to the processors and a second bus structure is used to broadcast pixel values of the previous frames to the processors.

After the error calculations for one row of block positions is complete, the error calculations are performed in parallel for the next row of block positions, e.g., the block positions resulting from shifting the block downward one pixel in the search area.

While the above-described circuit is highly efficient for estimating block vector displacements, the vector displacements are only obtained with integer pixel precision. However, for many situations, better performance may be obtained when the block vector displacements are obtained with fractional pixel precision. (See e.g., B. Girod et al., "Motion Compensation Prediction with Fractional Pel Accuracy for 64 Kbits/sec Coding of Moving Video", International Workshop on 64 Kbits/sec Coding of Moving Video, June 1988). In particular, a more precise match yields better compression results in coding.

In view of the foregoing, it is an object of the present invention to provide a circuit for implementing a block matching algorithm which estimates vector displacements with fractional pixel precision. It is a further object of the invention to provide an improvement for the above-described circuit for carrying out a block-matching algorithm so that vector displacements with fractional pixel precision are obtained.

SUMMARY OF THE INVENTION

In accordance with an illustrative embodiment of the present invention, a circuit is provided for obtaining a displacement vector with fractional pixel value precision for a block from a current video frame in a search area of a previous video frame. More particularly, the circuit of the present invention includes a first subcircuit for obtaining an estimate of the displacement vector with integer pixel precision and a second subcircuit for obtaining a further estimate of the displacement vector with fractional pixel precision. Illustratively, the displacement vector with integer pixel precision is obtained using the circuit described above and disclosed in the above-mentioned U.S. patent application Ser. No. 07/167,327.

When the position of the block of the current frame in the search area of the previous frame which provides the best match is obtained using the first subcircuit, the pixel values in this position of the search area are interpolated by the second subcircuit to obtain fractional pixel values. These fractional pixel values serve to define a new set of possible positions for the block in the search area. The second subcircuit then serves to compare the block with each new position in the search area by calculating an error (e.g. mean square or mean absolute) for each new position. The new position which yields the lowest error serves to provide a correction with fractional pixel precision for the displacement vector with integer precision previously obtained.

The second subcircuit takes advantage of the fact that the mean square or mean absolute error calculations for adjacent ones of the new positions in the search area utilize a significant number of fractional pixel value inputs in common. Thus, the second subcircuit includes a plurality of processors for calculating in parallel the errors for a plurality of the new positions in the search area.

In addition, in accordance with an illustrative embodiment of the present invention, the first and second subcircuits operate in parallel so that the second subcircuit obtains a displacement vector with fractional pixel precision for a first block of pixels from the current video frame while the first subcircuit obtains a displacement vector with integer precision for a second block of pixels from the current video frame.

DETAILED DESCRIPTION OF THE INVENTION

Figure 1:
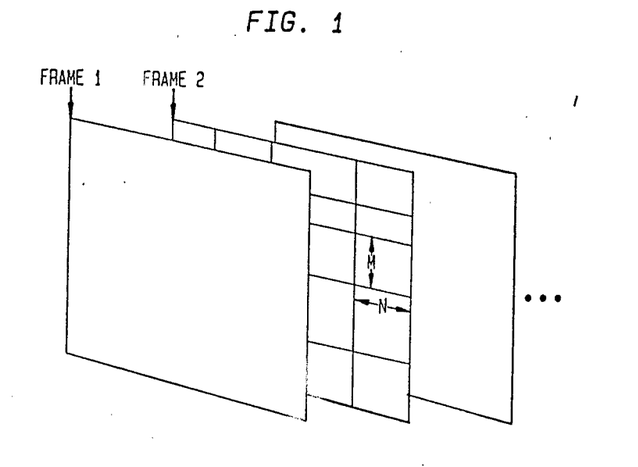
FIG. 1 schematically illustrates a sequence of video frames to be transmitted from a transmitter to a receiver.

FIG. 1 schematically illustrates a sequence of video frames to be transmitted from a transmitter (not shown) to a receiver (not shown). Illustratively, the frames comprise 256×256 pixels and 30 frames are transmitted per second.

As indicated above, for video conferencing applications, motion in a scene is usually low and successive frames contain large amounts of redundant information. Thus an interframe coding technique can be used to reduce the information redundancy between successive frames and achieve significant data compression.

As indicated above, the concern here is with a data compression technique known as motion detection and compensation. If the difference between frames 1 and 2 of FIG. 1 results from displacement or motion of an object and this difference is confined to a relatively small region of the frame, it is not necessary to transmit the full data of frame 2 to the receiver. Instead the displacement information (and compressed residual information) is transmitted to the receiver. The receiver then uses the displacement information to construct frame 2 from frame 1.

As indicated above, the displacement information may be obtained by means of a block matching algorithm. The block matching algorithm measures the similarity between a block of pixels in frame 2 and a plurality of equal sized blocks laid out in a search area of frame 1. Thus as shown in FIG. 1, frame 2 is divided into a plurality of blocks, each comprising M×N pixels. Illustratively, M and N are both equal to 16. For each block of pixels in frame 2, the block matching algorithm provides a displacement vector which indicates the displacement made by the block from its position in frame 1 to its position in frame 2. Thus, to implement a motion compensation video data compression algorithm, it is necessary to calculate a displacement vector for each block of pixels in frame 2. The displacement vectors are then transmitted to the receiver, which uses the displacement vectors to construct frame 2 from frame 1.

Figure 2:
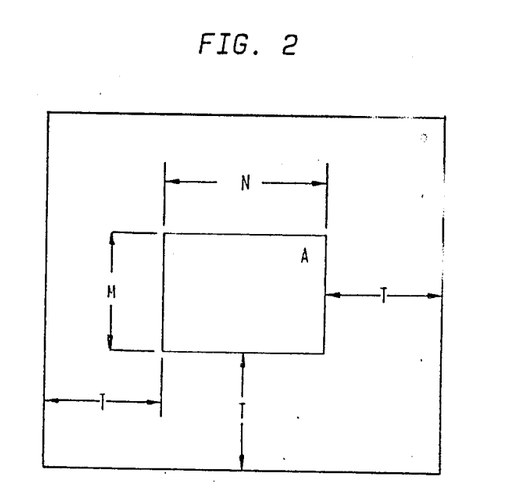
FIG. 2 schematically illustrates a block from a current video frame and a search area in a previous video frame.

FIG. 2 schematically illustrates a block of pixels from frame 2 (i.e, the current frame) and a search area from frame 1 (i.e., the previous frame). In FIG. 2, area A represents an M×N block of pixels from the current frame and area B represents a search area from the previous frame. The area of B is (M+2T)(N+2T) where, illustratively, T is eight pixels. Note that block A and search area B have the same center.

The purpose of the circuit of the present invention is to carry out a block matching algorithm for determining the position of block A in search area B in which the overlapped pixels in search area B are most similar to the pixels in block A. The displacement vector is the displacement of block A from its original position in search area B to the position such that the overlapped pixels in area B are most similar to the pixels of block A. The position of most similarity is determined by finding the position of the block in the search area with the smallest error function. In accordance with the present invention, this is done in two separate steps. In the first step, the optimal (i.e. most similar) position of block A in search area B is found with integer pixel value precision. In the second step, the optimal (i.e., most similar) position of block A in search area B is determined with fractional pixel value precision.

Figure 3:
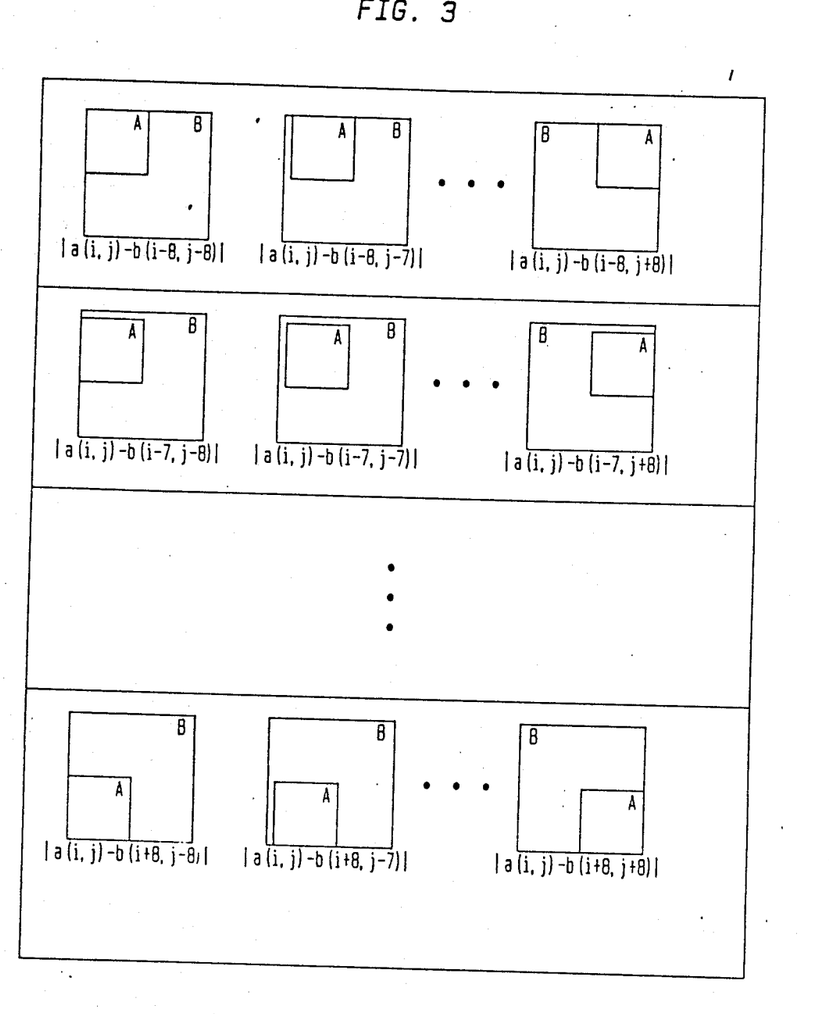
FIG. 3 illustrates the positions, as defined by integer pixel values, that a block from the current frame can occupy in the search area of the previous frame.

The first step, i.e., the determination of the optimal position of block A in search area B with integer pixel value precision, is now considered. The positions, as defined by integer pixel values, that the block A can take within the search area B are shown in FIG. 3. In FIG. 3, each shift of block A in the horizontal direction is a shift of one pixel and each shift of block A in the vertical direction is a shift of one pixel. Because the block A is 16 pixels wide and the search area is 32 pixels wide when T=8, there are 17 possible positions for block A in each of the 17 rows of FIG. 3, each of these positions differing from the adjacent ones by one pixel shift horizontally.

To determine the best match for block A in search area B, it is necessary to calculate, for example, the mean absolute error or the mean square error between the pixel values of block A and the overlapping pixel values of search area B for every possible position of block A in search area B as shown in FIG. 3. Thus, finding the best match for block A in search area B requires the computation of $(2T+1)^2$ error functions of the form $$\sum_i \sum_j |a(i, j) - b(i + m_i, j + m_j)|^p \quad (1)$$

One error function is calculated for each position of block A in search area B, i.e. for every pixel shift (horizontally) and every line shift (vertically) in the search area. In the foregoing equation, the $a(i, j)$'s represent the pixel values in block A and the $b(i, j)$'s represent the pixel values in the search area B. The values $m_i$, $m_j$ represent the integral displacement of the block A in the search area B. Thus $-T \leq m_i, m_j \leq T$ where for example $T=8$ pixels. Thus, in the upper left-hand corner of FIG. 3, the block is positioned so that $m_i = -8$ and $m_j = -8$. The values of $m_i$ and $m_j$ are indicated in the algebraic expression below the diagram of the corresponding block position in FIG. 3 which algebraic expressions are of the form $|a(i, j) - b(i+m_i, j+m_j)|$. In addition, in equation (1), $p=1$ corresponds to the mean absolute error and $p=2$ corresponds to the mean square error.

After the error for each position of block A in search area B is calculated, the errors are compared and the position of block A resulting in the minimum error is identified. The $m_i$, $m_j$ value for this position of block A then represents the displacement vector with integer pixel precision for the block A.

Figure 4:
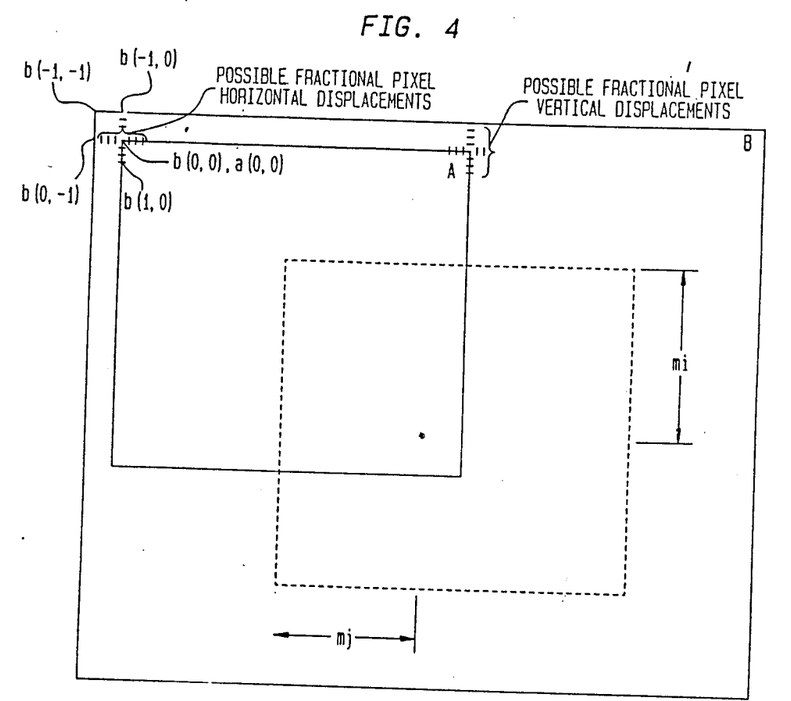
FIG. 4 illustrates the positions, as defined by fractional pixel values, that a block from the current frame can occupy in the search area of the previous frame.

FIG. 4 illustrates the block A in its optimal position in search area B. (The original position of block A in area B is shown in phantom in FIG. 4.) For purposes of clarity at this point, the base values $m_i$, $m_j$ are dropped from the addresses of the pixels in the search area B so that the pixel of search area B which coincides with the upper left-hand corner of the block A is designated $b(0, 0)$. Thus, in FIG. 4, $a(0, 0)$ coincides with $b(0, 0)$. The pixel values $b(0, 1)$, $b(0, -1)$, $b(1, 0)$, $b(-1, 0)$ and $b(-1, -1)$ are also illustrated in FIG. 4.

In the second step of the displacement vector determination process, it is the object to determine $\hat{m}_i$ and $\hat{m}_j$, where $\hat{m}_i$ and $\hat{m}_j$ are fractional pixel value corrections to $m_i$ and $m_j$ respectively. Illustratively, $\hat{m}_i$ and $\hat{m}_j$ can each take on the values $-1, -0.75, -0.50, -0.25, 0.0, 0.25, 0.50, 0.75$. These potential values for $\hat{m}_i$ and $\hat{m}_j$ define sixty-four new possible positions for the block A in the search area B. This can be understood as follows. For each of the eight possible fractional pixel displacements of the block A in vertical direction as represented by the different possible values of $\hat{m}_i$, there are eight possible fractional pixel displacements of the block A in the horizontal direction as represented by the different possible values of $\hat{m}_j$. The eight possible fractional pixel vertical displacements of the block A and the eight possible fractional pixel horizontal displacements of the block A are schematically indicated in FIG. 4.

To obtain a correction to the displacement vector $m_i$, $m_j$ with fractional pixel precision, the value $\hat{m}_i$, $\hat{m}_j$ which yields the smallest error function of the sixty-four possible values of $\hat{m}_i$, $\hat{m}_j$ is determined. This is accomplished by calculating an error function for the block A at each of the sixty-four possible fractional pixel positions in the search area B and finding the position (i.e. the value of $\hat{m}_i$, $\hat{m}_j$) which yields the minimum error. To calculate this set of sixty-four error functions, it is necessary to determine fractional pixel values for the search area B.

Fractional pixel values in the search area B are represented by $b_l^k$ where the superscript $k=0, 1, 2, 3$ represents vertical interpolation with quarter pixel precision and the subscript $l=0, 1, 2, 3$ represents horizontal interpolation with quarter pixel precision. Then, $$b_l^k(i,j) = \frac{4-l}{4}\left[\frac{4-k}{4}b(i,j) + \frac{k}{4}b(i+1,j)\right] + \frac{l}{4}\left[\frac{4-k}{4}b(i,j+1) + \frac{k}{4}b(i+1,j+1)\right] \quad (2)$$

and $$b_l^k(i,j) = b_l^0(i+1,j), \; b_4^k(k,j) = \quad (3)$$

$$b_0^k(i,j+1) \text{ for } k, l = 0, 1, 2, 3$$

Figure 5:
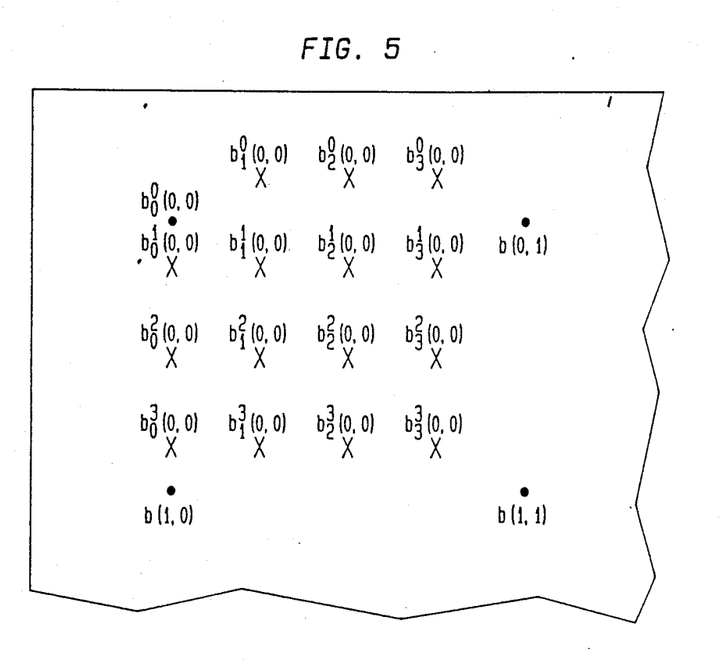
FIG. 5 illustrates fractional pixel values.

FIG. 5 schematically illustrates a plurality of fractional pixel values which are calculated according to the formulas identified above. In FIG. 5, integer pixel values are identified by "circles" and fractional pixel values are identified by "crosses."

Each of the error functions corresponding to a pair $\hat{m}_i, \hat{m}_j$ is of the form $$\sum_i \sum_j |a(i,j) - b_l^k(i,j)|^p \quad (4)$$

where p is an integer. The smallest error function defines an $\hat{m}_i$ and $\hat{m}_j$ which are added to $\hat{m}_i$ and $\hat{m}_j$, respectively, to obtain a displacement vector with fractional pixel precision.

Figure 6:
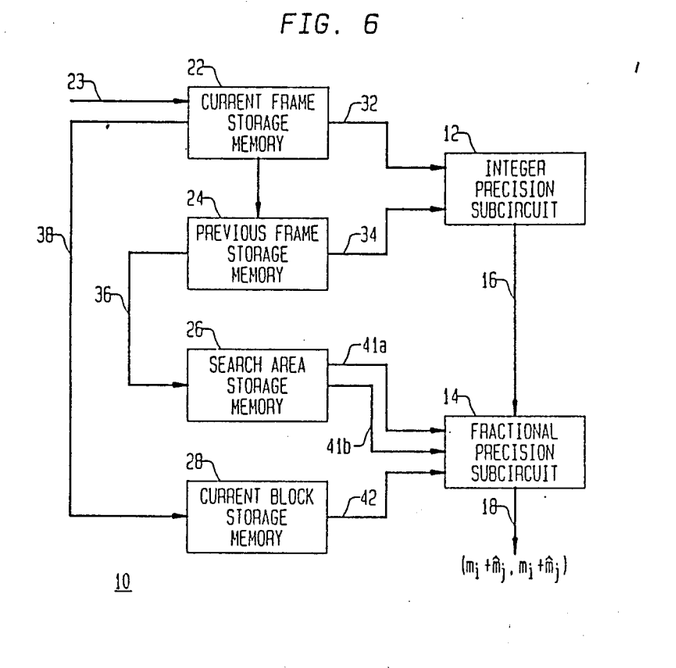
FIG. 6 schematically illustrates a circuit for carrying out a block matching algorithm and comprising a first subcircuit for determining displacement vectors with integer pixel value precision and a second subcircuit for determining displacement vectors with fractional pixel value precision, in accordance with an illustrative embodiment of the present invention.

FIG. 6 schematically illustrates a circuit 10 for carrying out a block matching algorithm which provides displacement vectors with fractional pixel precision. The circuit 10 comprises two subcircuits 12 and 14. The subcircuit 12 determines a displacement vector with integer pixel value precision for each block of pixels in a current frame of video in a corresponding search area of a previous frame. In other words, the circuit 12 determines $m_i, m_j$ for each block in the current frame. An implementation of the subcircuit 12 is described in detail in the above-mentioned U.S. patent application. The subcircuit 14 determines corrections with fractional pixel value precision for the displacement vectors obtained by subcircuit 12. In other words, the subcircuit 14 obtains $\hat{m}_i, \hat{m}_j$. In particular, the subcircuit 14 receives the values $m_i, m_j$ on line 16 and outputs the values $m_i+\hat{m}_i, m_j+\hat{m}_j$ on line 18. The subcircuit 14 is described in greater detail below in connection with FIG. 7.

The circuit 10 comprises four memories 22, 24, 26, and 28. The memory 22 receives the current video frame on line 23 and stores this frame. The memory 24 stores the previous video frame. The memories 22 and 24 supply pixel values to the subcircuit 12 via lines 32 and 34 respectively.

The memory 26 stores a search area from the previous frame and the memory 28 stores a block from the current frame. The memory 26 receives its search area pixel values via line 36 and the memory 28 receives its current block pixel values via line 38. The memories 26 and 28 supply pixel values to the subcircuit 14 via lines 41a and 41b, and 42, respectively. The values $m_i, m_j$ produced on line 16 by subcircuit 12 are communicated to an address generator in the subcircuit 14 so that appropriate pixels from the search area are transmitted to the subcircuit 14.

Figure 7:
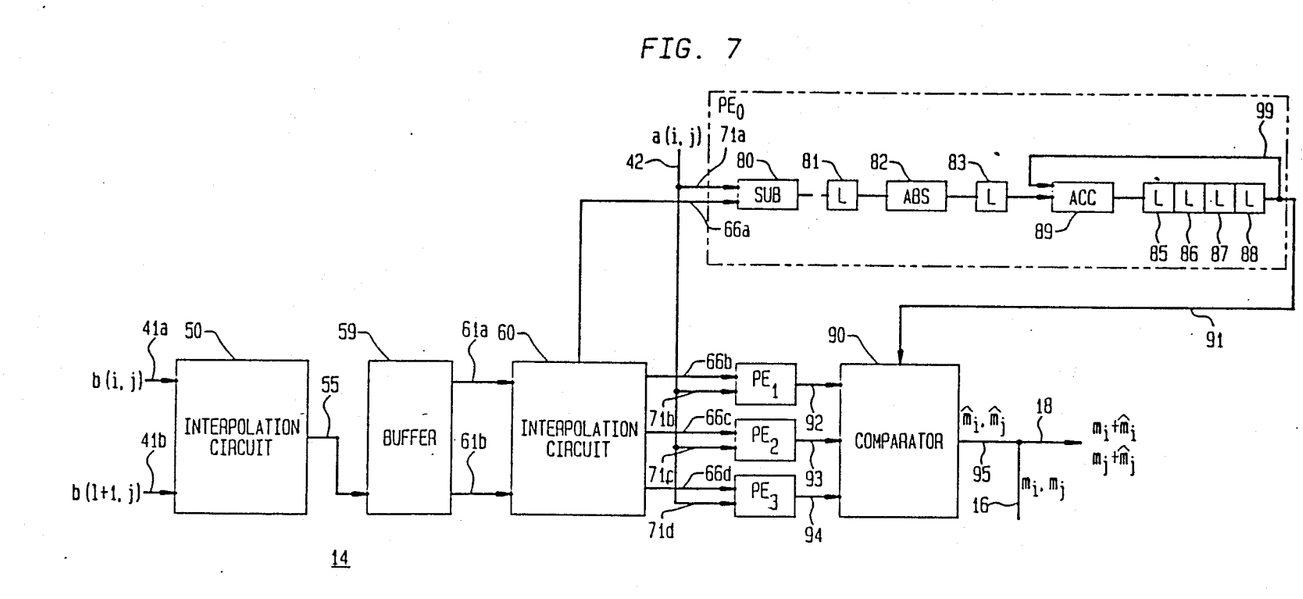
FIG. 7 schematically illustrates a subcircuit for determining displacement vectors with fractional pixel value precision for use in the circuit of FIG. 6.

The subcircuit 14 is illustrated in greater detail in FIG. 7. The pixel values $b(i, j)$, $b(i+i, j)$ from the search area of the previous frame are received from the memory 26 (see FIG. 6) via lines 41a and 41b and the pixel values $a(i, j)$ from the block of the current frame are received from the memory 26 (see FIG. 6) via line 42. The pixel values $b(i, j)$, $b(i+1, j)$ are obtained from the memory 26 in response to addresses generated by an address generator (not shown) forming part of the subcircuit 14. The subcircuit 14 comprises two interpolation circuits 50 and 60. The interpolation circuits 50 and 60 collectively operate to calculate fractional pixel values for the search area in accordance with the formula of Eq(2) above. In particular, the interpolation circuit 50 does vertical interpolation and the interpolation circuit 60 does horizontal interpolation.

Figure 8:
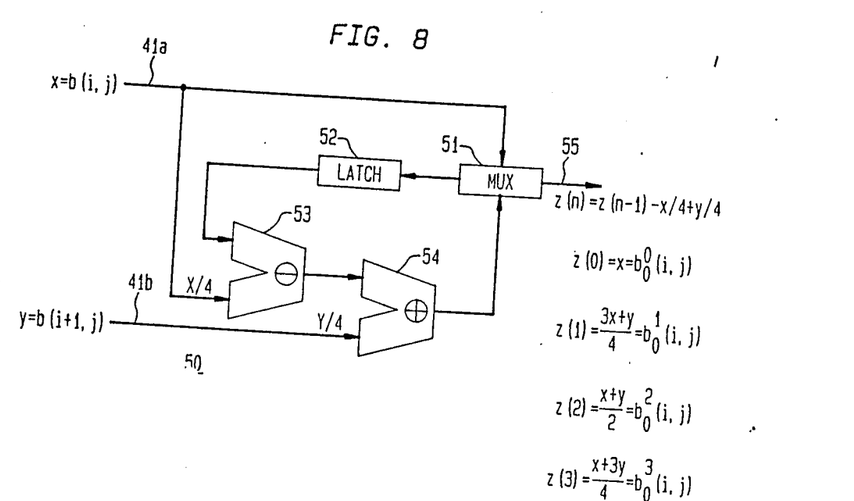
FIG. 8 schematically illustrates an interpolation circuit for interpolating pixel values in the vertical direction.

The interpolation circuit 50 is shown in greater detail in FIG. 8. The interpolation circuit 50 receives the pixel values $b(i, j)=x$ and $b(i+i, j)=y$ on lines 41a and 41b respectively. The interpolation circuit 50 comprises the multiplexer 51, the latch 52, the arithmetic logic circuit 53 and the arithmetic logic circuit 54. The interpolation circuit 50 sequentially produces on line 55 the linearly interpolated pixel value outputs according to the formula $$z(n) = z(n-1) - x/4 + y/4 \quad (5)$$

so that $$z(0) = x = b_0^0(i,j) \quad (6)$$

$$z(1) = \frac{3x+y}{4} = b_0^1(i,j) \quad (7)$$

$$z(2) = \frac{x+y}{2} = b_0^2(i,j) \quad (8)$$

$$z(3) = \frac{x+3y}{4} = b_0^3(i,j) \quad (9)$$

These interpolated pixel values are stored in the buffer 59 (see FIG. 7).

The buffer 59, which illustratively comprises a plurality such as five latches, buffers intermediate interpolated pixel values produced by the vertical interpolation circuit 60. These intermediate pixel values are received by the interpolation circuit 60 from the buffer 59 on lines 61a and 61b.

Figure 9:
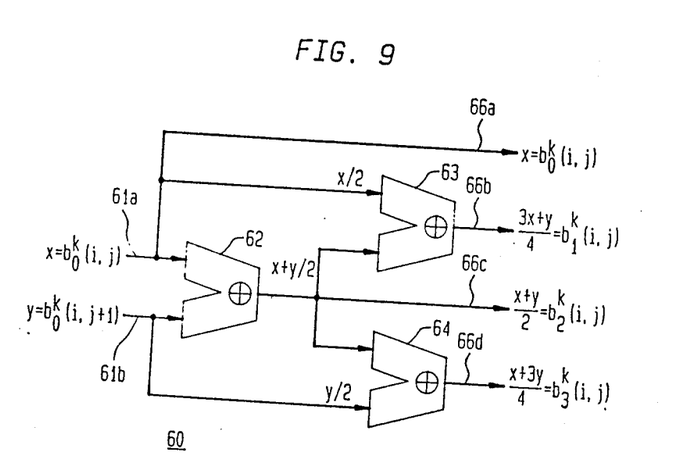
FIG. 9 schematically illustrates an interpolation circuit for interpolating pixel values in the horizontal direction.

The interpolation circuit 60 is shown in greater detail in FIG. 9. The interpolation circuit 60 comprises the arithmetic logic circuits 62, 63 and 64. The pixel values $x=b_0^k(i,j)$ are received on line 61a and the pixel values $y=b_0^k(i,j+1)$ are received on line 61b. The interpolation circuit 60 outputs in parallel four interpolated pixel values on lines 66a, 66b, 66c, and 66d. The outputted values are as follows:

$$x = b_0^k(i,j) \text{ (on line 66a)} \quad (10)$$

$$\frac{3x+y}{4} = b_1^k(i,j) \text{ (on line 66b)} \quad (11)$$

$$\frac{x+y}{2} = b_2^k(i,j) \text{ (on line 66c)} \quad (12)$$

-continued $$\frac{x+3y}{2} = b_3^k(i,j) \text{ (on line 66d)} \quad (13)$$

As indicated above, an error function of the form of equation (4) is calculated for each possible fractional position. As is explained in more detail below, a plurality of these error functions are calculated in parallel utilizing the processors $PE_0$, $PE_1$, $PE_2$ and $PE_3$ of FIG. 7. The processors $PE_0$, $PE_1$, $PE_2$ and $PE_3$ receive the pixel values a(i, j) of the block of the current frame via the lines 71a, 71b, 71c and 71d, respectively. Similarly, the processors $PE_0$, $PE_1$, $PE_2$ and $PE_3$ receive the interpolated pixel values $b_0^k(i,j)$, $b_1^k(i,j)$, $b_2^k(i,j)$, $b_3^k(i,j)$ from the interpolation circuit 60 via lines 66a, 66b, 66c and 66d, respectively.

The processors $PE_0$, $PE_1$, $PE_2$, $PE_3$ calculate sixteen error functions—corresponding to sixteen fractional pixel positions of the block in the search area—at a time. In other words, one-fourth of the sixty-four functions (corresponding to each of the sixty-four possible fractional pixel positions of the block in the search area) are calculated simultaneously. To accomplish this, each of the four processors calculates in a time multiplexed fashion four error functions. To calculate four error functions, each processor does a calculation of the form $|a(i,j) - b_r^k(i,j)|$ for each of the four error functions in a round robin fashion. The data flow which enables this high degree of parallel processing is described below in connection with FIG. 10.

All of the processors $PE_0$, $PE_1$, $PE_2$, and $PE_3$ are of substantially identical construction. The processor $PE_0$ is shown in greater detail in FIG. 7. The processor $PE_0$ comprises a subtractor circuit 80 for performing a subtraction of the form $a(i,j) - b_r^k(i,j)$, a latch 81, and an absolute value circuit 82 for calculating the absolute value of the subtraction result if the error function to be calculated is the mean absolute error. (If the error function to be calculated is a mean square error rather than a mean absolute error, the absolute value circuit is replaced by a squaring circuit). The output of the circuit 82 is stored in the latch 83.

The processor $PE_0$ includes an accumulator circuit 89. The accumulator 89 calculates an intermediate result for each of its four error functions sequentially in a round robin fashion.

The processor $PE_0$ contains four latches 85, 86, 87, and 88 for storing intermediate results for each of the four error functions it is calculating. The latches 85, 86, 87, 88 are connected serially so that a particular intermediate result is first stored in the latch 85 and is then sequentially transmitted to the latches 86, 87, and 88. Thus, the intermediate results for the four error calculations are passed sequentially from the latch 85 to the latch 86, to the latch 87, to the latch 88 and back to the accumulator 89 via line 99. The outut values of the form $|a(i,j) - b_r^k(i,j)|$ produced by the circuit 82 are also produced sequentially for each of the four error functions. Each output of the circuit 82 belonging to a particular error function calculation is added by the accumulator 89 to the previous accumulated value for that error function stored in the last latch 88. The new intermediate result is then stored in the first latch 85 and pipelined through the latches 86, 87, 88 so that the new intermediate result returns to the accumulator when the circuit 82 outputs a value for that error function. Thus, in the foregoing manner each processor $PE_0$, $PE_1$, $PE_2$, $PE_3$ calculates four error functions simultaneously.

The error functions calculated by the processors $PE_0$, $PE_1$, $PE_2$, $PE_3$ are transmitted to the comparator unit 90 via the lines 91, 92, 93, 94. The comparator unit 90 determines which of the sixty-four error functions is smallest and thereby provides error minimizing values for $\hat{m}_i$ and $\hat{m}_j$. The error minimizing values off $\hat{m}_i$ and $\hat{m}_j$ on line 95 are combined with the integer precision displacement values $m_i$ and $m_j$ on line 16 to produce a displacement vector with fractional pixel value precision, i.e. $m_i + \hat{m}_i$, $m_j + \hat{m}_j$, on line 18.

Figures 10, 10A:
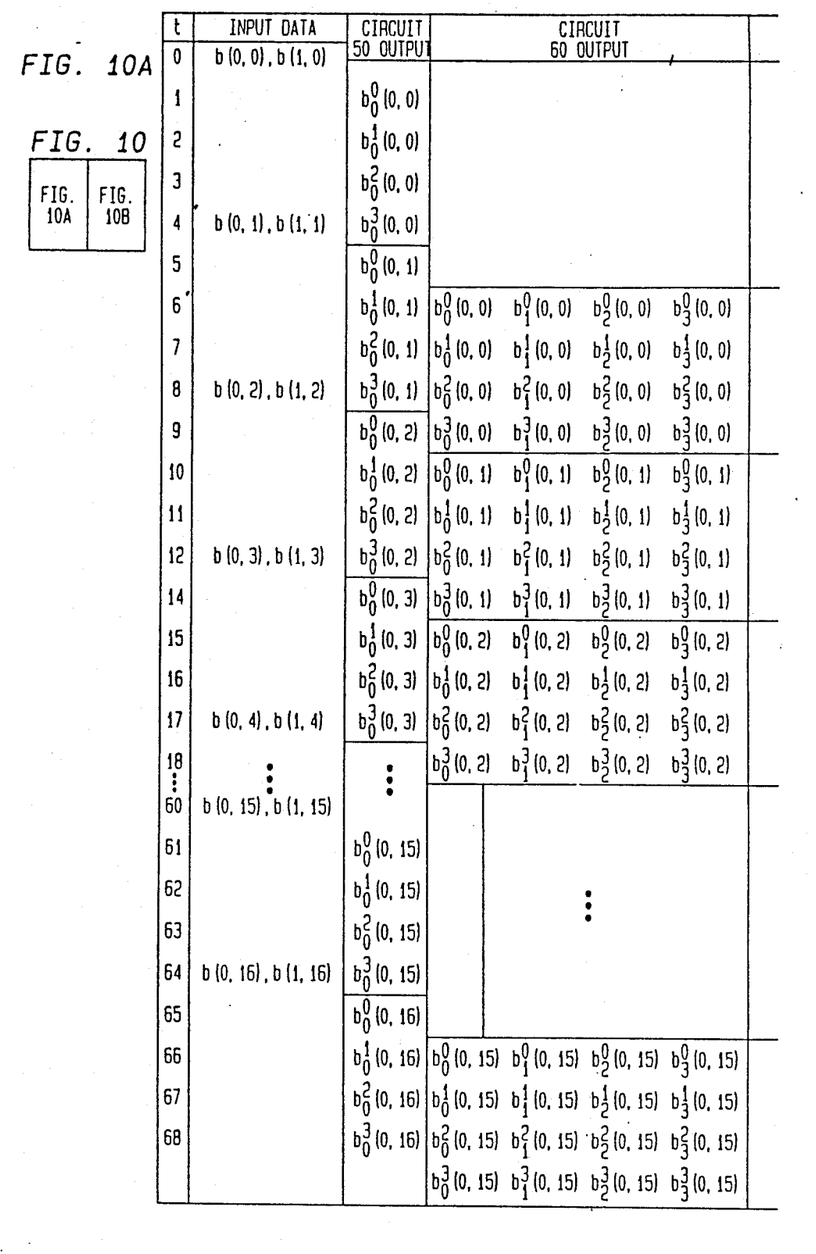
FIGS. 10, 10a and 10b are charts which illustrate the data flow in the circuit of FIG. 7.
Figure 10B:
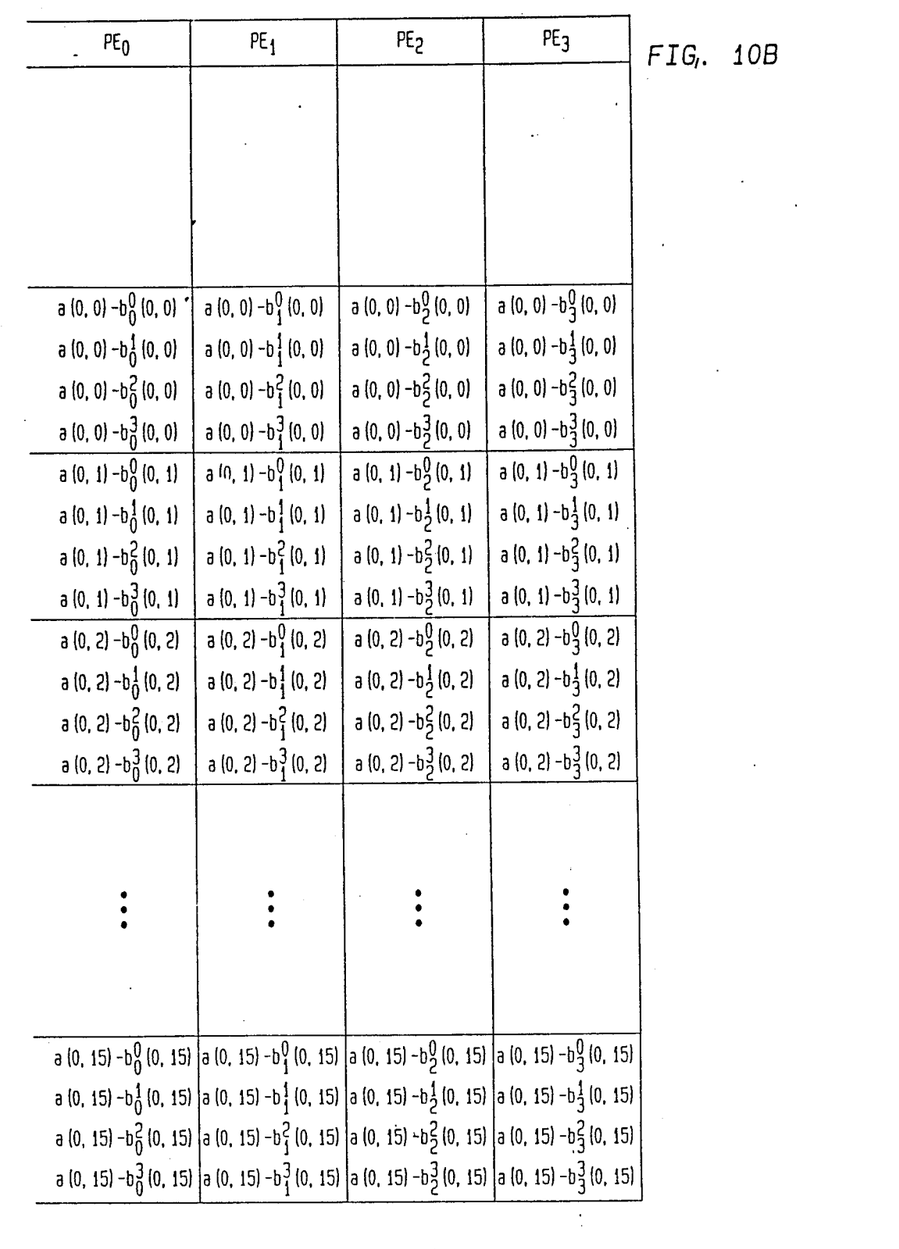

As indicated above, the interpolated pixel values are produced by the interpolation circuit 60 and transmitted to the processors $PE_0$, $PE_1$, $PE_2$ and $PE_3$ in an order such that each processor calculates four error functions simultaneously in a time multiplexed fashion. The data flow of the circuit 14 of FIG. 7 is shown in FIG. 10. In particular, FIG. 10 provides the data flow for the simultaneous calculation of sixteen error functions by the processors $PE_0$, $PE_1$, $PE_2$, and $PE_3$. These sixteen error functions correspond to $\hat{m}_i$ and $\hat{m}_j$ when $\hat{m}_i = 0, 0.25, 0.50, 0.75$ and $\hat{m}_j = 0, 0.25, 0.50, 0.75$ (in other words the positions obtained in FIG. 4 by moving the block A downward and to the right in the search area B).

The first column in FIG. 10 denotes time in the form of a cycle number. The second column in FIG. 10 presents the sequence of pixel values b(i, j) from the seach area of the previous frame that is inputted into the vertical interpolation circuit 50. The third column of FIG. 10 presents the sequence of intermediate fractional pixel values produced by the vertical interpolation circuit 50. The fourth column presents the fractional pixel values produced by the horizontal interpolation circuit 60. The horizontal interpolation circlult 60 produces four fractional pixel values in parallel. The columns designated $PE_0$, $PE_1$, $PE_2$, $PE_3$ show the calculations performed by each processor during each cycle.

FIG. 10 shows only the first 68 cycles of the simultaneous calculation of the sixteen error functions, which 68 cycles involve integer pixel values in the first overlapped row of the search area, i.e. b(0, 0) ... b(0, 16). Thus to fully calculate the sixteen error functions 1088 cycles are required and to fully calculate the full set of sixty-four error functions 4352 cycles are required.

In short, a circuit for carrying out a full search block matching algorithm with fractional pixel precision has been disclosed. The circuit comprises a first subcircuit for obtaining displacement vectors with integer pixel value precision and a second subcircuit for correcting the displacement vectors obtained by the first subcircuit so that the displacement vectors have fractional pixel value precision. To obtain a displacement vector with integer pixel value precision for a block of pixels of a current video frame in a search area of a previous video frame, the first subcircuit finds a first specific position of the block with the smallest error out of a first plurality of positions defined by integer pixel values in the search area. The second subcircuit interpolates the integer pixel values of the first specific position to obtain fractional pixel values which define a second plurality of positions in the search area. The second subcircuit then determines which position of the block in the second plurality of positions has the smallest error, thereby providing a correction with fractional pixel precision for the displacement vector.

Finally, the above-described embodiments of the invention are intended to be illustrative only. Numerous alternative embodiments may be devised by those skilled in the art without departing from the spirit and scope of the following claims.

What is claimed is:

1. A circuit for providing a displacement vector for a block of pixels from a current video frame in a search area of a previous video frame, said circuit comprising
   a first subcircuit for providing said displacement vector with integer pixel value precision by finding a first specific position of said block with the smallest error out of a first plurality of positions in said search area, said first plurality of positions being defined by integer pixel values, and
   a second subcircuit in communication with said first subcircuit for providing said displacement vector with fractional pixel value precision and including interpolation means for interpolating the integer pixel values of said first specific position in said search area to define a second plurality of positions in said search area, said second plurality of positions being defined with fractional pixel values, and a plurality of processors operating in parallel for finding a second specific position of said block with the smallest error out of the second plurality of positions.

2. The circuit of claim 1 wherein said interpolation means comprises a first interpolation circuit for interpolating the integer pixel values of the first specific position vertically and a second interpolation circuit for interpolating horizontally the integer pixel values of the first specific position.

3. The circuit of claim 1 wherein each of said processors comprises
   means for performing calculations of the form $$|a(i, j) - b_j^k (i, j)|^p$$

where $a(i, j)$ is a pixel value from the block of the current video frame, $b_j^k (i, j)$ is an interpolated pixel value from the search area of the previous video frame, and $p$ is an integer.

4. The circuit of claim 3 wherein each of said processors further includes
   an accumulator having a first input for receiving outputs of said circuit means, a second input, and an output,
   a plurality of latches connected in a sequence, the first latch of said sequence being connected to said output of said accumulator and the last latch of said sequence being connected to said second input of said accumulator,
   said accumulator sequentially accumulating outputs of said circuit means with previously calculated intermediate results for each of a group of error functions corresponding to a group of positions of said block of said current frame out of said second from latch to latch in said sequence of latches and back to said accumulator for further accumulation with an output of said circuit means until calculation of said error functions is complete.

5. The circuit of claim 1 wherein said circuit further comprises
   a first memory means in communication with said first subcircuit for storing said current video frame,
   a second memory means in communication with said first subcircuit for storing said previous video frame,
   a third memory means in communication with said second subcircuit for storing the search area of the previous frame, and
   a fourth memory means in communication with said second subcircuit for storing the block from the current frame.

6. A circuit for carrying out a full search block matching algorithm with fractional pixel value precision comprising
   a first subcircuit for obtaining displacement vectors with integer pixel value precision for blocks of pixels of a current video frame in corresponding search areas of a previous video frame, and
   a second subcircuit in communication with said first subcircuit for obtaining corrections to said displacement vectors with integer pixel value precision so that said displacement vectors have fractional value precision, said second subcircuit comprising interpolation means for interpolating integer pixel values at specific positions in said search areas defined by said displacement vectors with integer value precision to obtain fractional pixel values, and processing means for calculating error functions for each of said blocks at a plurality of positions in the corresponding search areas defined by said fractional pixel values.

7. The circuit of claim 6 wherein said first subcircuit obtains said displacement vectors with integer pixel value precision by finding a first particular position of each block with the smallest error out of a first plurality of positions defined by integer pixel values in the corresponding search area.

8. The circuit of claim 7 wherein said fractional pixel values define a second plurality of positions for each block in the corresponding search area and wherein said second circuit provides said displacement vectors with fractional pixel value precision by finding the position of each block with the smallest error out of the second plurality of positions in the corresponding search area.

9. The circuit of claim 6 wherein said processing means comprises a plurality of individual processors operating in parallel.

10. The circuit of claim 6 wherein said interpolation means comprises a first vertical interpolation circuit and a second horizontal interpolation circuit.

11. The circuit of claim 6 wherein said first and second subcircuits operate in parallel so that when said second subcircuit in determining a displacement vector with fractional pixel precision for one block in one search area said first subcircuit is determining a displacement vector with integer pixel precision for a second block in a second search area.

12. A method for determining a displacement vector for a block of pixels from a current video frame in a search area of a previous video frame comprising
    determining said displacement vector with integer pixel value precision by finding a first specific position of said block with the smallest error out of a first plurality of positions in said search area, said first plurality of positions being defined by integer pixel values, and
    determining said displacement vector with fractional pixel value precision by interpolating the integer pixel values of said first specific position in said search area for providing fractional pixel values to define a second plurality of positions in said search area, and finding a second specific position of said block with the smallest error out of the second plurality of positions.

* * * * *

UNITED STATES PATENT AND TRADEMARK OFFICE
CERTIFICATE OF CORRECTION

PATENT NO.   : 4,937,666
DATED        : June 26, 1990
INVENTOR(S)  : Kun-Min Yang It is certified that error appears in the above-indentified patent and that said Letters Patent is hereby corrected as shown below:

In the abstract, lines 5 and 6, "the subcircuit" should be
    --the first subcircuit--;
            line 8, "integer value" should be
    --integer pixel value--.
Column 2, line 40, after "algorithm" insert --now Patent 4,897,720,
    issued January 30, 1990--.
Column 8, line 1, "appropropriate" should be --appropriate--.
Column 10, line 27, "seach" should be --search--;
         line 34, "circluit" should be --circuit--.
Column 7, line 68, "appropropriate".

Signed and Sealed this

Fourteenth Day of June, 1994

Attest:

BRUCE LEHMAN

*Attesting Officer*       Commissioner of Patents and Trademarks